(12) United States Patent
Mullen et al.

(10) Patent No.: US 7,054,154 B2
(45) Date of Patent: May 30, 2006

(54) SYSTEM AND METHOD FOR A MULTI-FUNCTIONAL SECURITY MECHANISM IN A DOCKING STATION

(75) Inventors: Cassius J. Mullen, Georgetown, TX (US); Kevin L. Kamphuis, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/054,239

(22) Filed: Feb. 9, 2005

(65) Prior Publication Data

US 2005/0146849 A1    Jul. 7, 2005

Related U.S. Application Data

(63) Continuation of application No. 10/327,519, filed on Dec. 20, 2002, now Pat. No. 6,885,552.

(51) Int. Cl.
*G06F 1/16* (2006.01)

(52) U.S. Cl. .................. 361/686; 710/303; 710/304

(58) Field of Classification Search .......... 361/683, 361/686; 710/303, 304
See application file for complete search history.

(56) References Cited

U.S. PATENT DOCUMENTS

| | | | |
|---|---|---|---|
| 5,757,616 A | 5/1998 | May et al. ................ | 361/683 |
| 5,870,283 A | 2/1999 | Maeda et al. .............. | 361/686 |
| 5,926,627 A * | 7/1999 | Sugimura .................. | 710/303 |
| 5,933,322 A | 8/1999 | Ruch et al. ................ | 361/686 |
| 5,995,366 A | 11/1999 | Howell et al. ............. | 361/686 |
| 6,061,234 A | 5/2000 | Broder et al. .............. | 361/686 |
| 6,185,095 B1 | 2/2001 | Helot et al. ............... | 361/686 |
| 6,236,571 B1 | 5/2001 | Dohi et al. ................ | 361/727 |
| 6,331,934 B1 | 12/2001 | Helot et al. ............... | 361/686 |
| 6,418,013 B1 | 7/2002 | Broder et al. .............. | 361/686 |
| 6,560,103 B1 * | 5/2003 | Dohi et al. ................ | 361/686 |
| 6,606,243 B1 | 8/2003 | Kamimaki et al. ........ | 361/686 |

* cited by examiner

Primary Examiner—Lynn Feild
Assistant Examiner—Anthony Q. Edwards
(74) Attorney, Agent, or Firm—Baker Botts L.L.P.

(57) ABSTRACT

A system and method for a multi-functional security mechanism in a docking station is disclosed. A docking station includes a hook to secure a portable computer to the docking station. A base plate includes a locked orientation and an unlocked orientation. A lever couples to the base plate to cause the base plate to actuate between the locked and unlocked orientation. A media bay, disposed in the docking station, receives a media device. A media bay lock pin couples to the media bay, engages the media device, and prevents removal of the media device from the media bay. A media bay lock couples to the base plate to release the media bay lock pin to engage the media device placed in the media bay. A media device sensor may associate with the media bay lock pin to permit the media bay lock pin to engage the media device.

19 Claims, 5 Drawing Sheets

SYSTEM AND METHOD FOR A MULTI-FUNCTIONAL SECURITY MECHANISM IN A DOCKING STATION

CROSS REFERENCE TO RELATED APPLICATIONS

This application is a continuation application of U.S. application Ser. No. 10/327,519 filed Dec. 20, 2002, and entitled System and Method for a Multi-Functional Security Mechanism in a Docking Station, now U.S. Pat. No. 6,885,552.

TECHNICAL FIELD

This disclosure relates in general to the field of computers, and more particularly to a system and method for a multi-functional security mechanism in a docking station.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A portable computer is one type of an information handling system. Examples of portable computers include laptop computers, notebook computers, and hand-held computers. Although portable computers are smaller than desktop computers, portable computers may provide equal computing power. Thus a portable computer may be preferable over a desktop computer because of the portable feature.

Portable computer designs may reduce certain component sizes, such as a monitor or keyboard, to achieve the portable feature. In some instances, the designs eliminate certain computer components to reduce the weight and size of the computer to further achieve portability. In other designs, components such as optical disk drives and floppy disk drives may be provided as a modular interchangeable media device to allow users to select a computer component for use. In further designs, the size of the computer housing may be reduced, which does not permit a user to place standard sized expansion cards, such as peripheral component interconnect (PCI) cards in the housing.

To allow a user the option of having access to other computer components and to connect to a network, a portable computer may be connected to a docking station. The portable computer may attach to the docking station for interconnecting with other computer components connected to the docking station. For example, a docking station may provide interconnections with standard sized computer components such as a monitor or full-sized keyboard, or allow for an additional media device, such as a hard disk drive or digital video disk (DVD" drive, to be used with the portable computer. Some docking stations may provide auxiliary ports for placing standard sized expansion cards that can be accessed by the portable computer.

Due to the ease of portability, portable computers are prone to theft. Additionally, docking stations and any computer components connected to the docking station may also be prone to theft. Therefore, many users desire to incorporate security features into their docking stations. Unfortunately, conventional techniques for adding these features are often overly complex and burdensome. Often, the conventional techniques for adding security features to a docking station force a user to interact with the security features to separately lock and unlock the portable computer and each of the various component devices protected by the security feature. Various locking devices can be both confusing for the user and expensive to implement.

SUMMARY

Therefore, a need has arisen for a system or method for a multi-functional security mechanism in a docking station.

A further need has arisen for a system or method for a single touch multi-functional security mechanism for a docking station.

A further need has arisen for a system or method for connecting devices to a multi-functional docking station while the docking station is secured.

In accordance with the teachings of the present disclosure, a docking station having a multi-functional security mechanism is described, which substantially reduce or eliminate the disadvantages and problems associated with previous docking stations. In some embodiments of the present disclosure, a docking station includes at least one hook to secure a portable computer to the docking station. A base plate may associate with the docking station such that the base plate includes a locked orientation and an unlocked orientation. A lever may be coupled to the base plate to cause the base plate to actuate between the locked orientation and the unlocked orientation. A media bay may be disposed in the docking station and may receive a media device. A media bay lock pin may couple to the media bay, engage the media device, and prevent removal of the media device from the media bay. A media bay lock may couple to the base plate to release the media bay lock pin for engaging the media device placed in the media bay. A media device sensor may associate with the media bay lock pin to permit the media bay lock pin to engage the media device.

In other embodiments, a method for securing a docking station includes sliding a lever to a locked position to actuate one or more locks associated with the docking station. In response to the actuation of the one or more locks, the method automatically determines if a media device is located in a media bay. A media bay lock pin is automatically released to engage the media device if the media device is located in the media bay.

In further embodiments, an information handling system may include a docking station able to receive a portable computer at a docking port. A computer hook located on the docking station may secure the portable computer to the docking station. A lever may be associated with the docking station to move between an unlocked position and a locked position. A base plate may be connected with the lever to actuate along a guided path to engage one or more locks. An ejection switch may be coupled to the docking station and may actuate the computer hook to release the portable computer. A computer hook lock may prevent the computer hook from releasing the portable computer from the docking station. An ejection switch lock may prevent the actuation of the ejection switch on the docking station. A media device sensor may be associated with a media bay to determine whether a media device is placed in the media bay. A media bay lock pin coupled to the media bay may engage the media device in the media bay if the media device is placed in the media bay.

The present disclosure contains a number of important technical advantages. One technical advantage is a multi-functional security mechanism in a docking station. The docking station utilizes a base plate and a lever to engage one or more locks in the docking station. The locks, once engaged, may prevent access to or removal of components placed in connection with the docking station. The multi-functional security mechanism may include a single lock to secure the computer components placed in combination with the docking station.

Another technical advantage provides a security mechanism that is operable by a single touch. Once a lever is placed in a locked position, multiple security mechanisms may engage to prevent access to or removal of components from the docking station. Previous security mechanisms often require a user to activate and lock each device on the docking station individually. In some embodiments, the multi-functional security mechanism activates one or more locks with a single movement of the lever to the locked position.

A further technical advantage is the ability to attach computer components to the docking station while the docking station is secured such as when the lever placed in a locked position. Adding computer components to a secured docking station permits a user to secure additional computer components without unsecuring the docking station. Previous docking stations require users to unsecure the docking station before adding additional computer components. For example, a media device may be inserted into a media bay while the docking station is secured to allow a locking mechanism to automatically secure the media device to the docking station. In certain embodiments, a media bay sensor determines if a media device is present in the media bay to allow a media bay lock pin to engage the media device.

All, some, or none of these technical advantages may be present in various embodiments of the present invention. Other technical advantages will be apparent to one skilled in the art from the following figures, descriptions, and claims.

BRIEF DESCRIPTION OF THE DRAWINGS

A more complete understanding of the embodiments of the present disclosure and advantages thereof may be acquired by referring to the following description taken in conjunction with the accompanying drawings, in which like reference numbers indicate like features, and wherein.

DETAILED DESCRIPTION

Preferred embodiments of the present disclosure and their advantages are best understood by reference to FIGS. 1 through 5C, where like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices, as well as various input and output (I/O) devices, such as a keyboard, a mouse, and a video display. The information handling system may also include one or more buses operable to transmit communications between the various hardware components.

Figure 1:
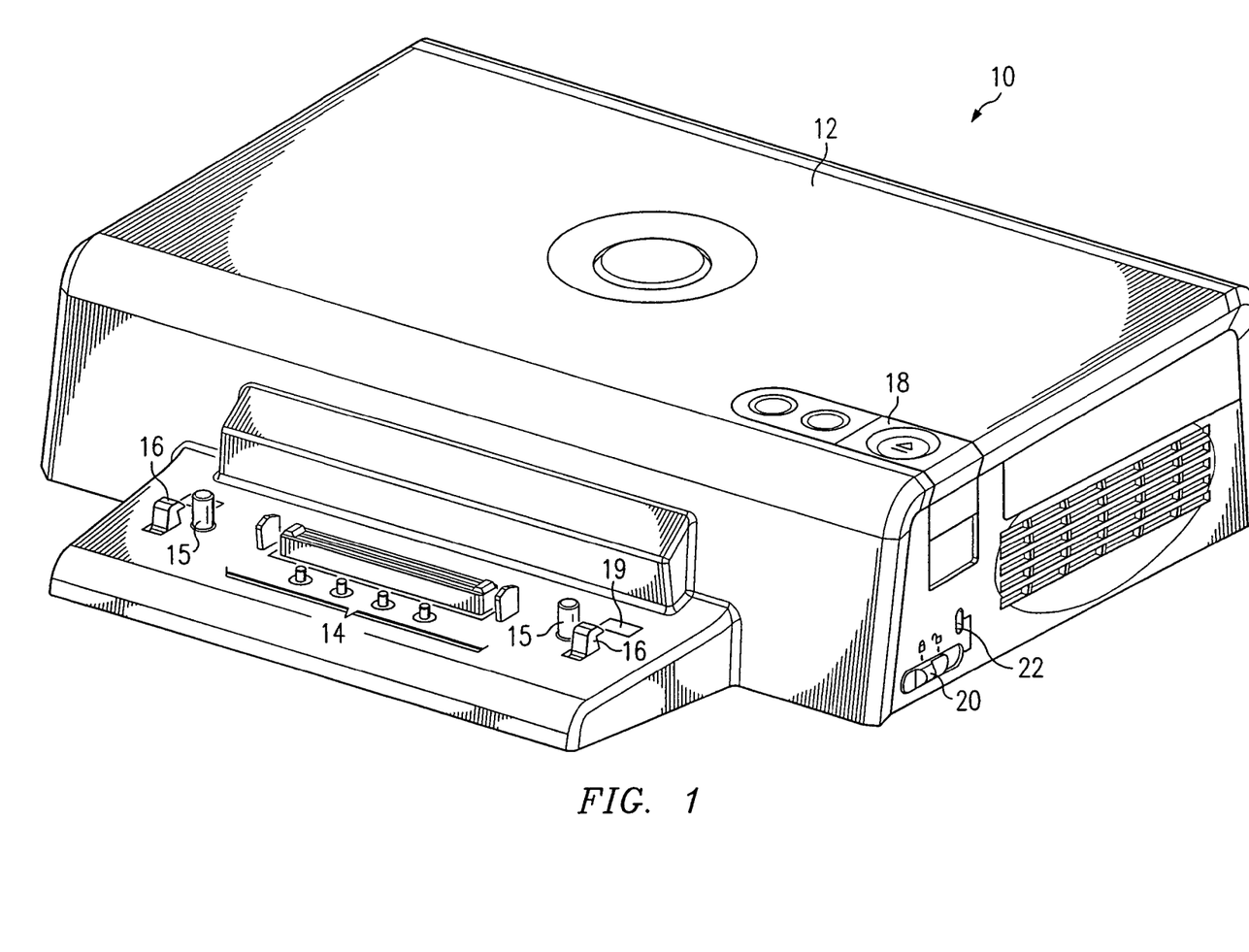
FIG. 1 illustrates a perspective view of a docking station including a multi-functional security mechanism according to an example embodiment of the present disclosure.

FIG. 1 illustrates a perspective view of docking station 10 including multi-functional security mechanism 33, as described below. One type of information handling system includes a portable computer (not expressly shown) coupled to docking station 10. Docking station 10 may include docking port 14 and housing 12. Docking port 14 may provide a connection for a portable computer to attach to docking station 10. Docking port 14 may include electrical and power connections to allow docking station 10 to communicate with the portable computer. In some embodiments, docking port 14 may couple to a bottom portion of a portable computer to allow a user to access computer components associated with docking station 10 and docking port 14.

Alignment tab 15 may be formed on docking station 10 and may be used in conjunction with docking port 14 to guide the portable computer onto docking port 14. In some embodiments, alignment tab 15 may mate with receive tabs formed on the portable computer housing. Typically, alignment tabs 15 may guide the portable computer into a proper orientation for connecting with docking station 10.

Housing 12 may enclose and prevent access to computer components placed in connection with docking station 10. In some embodiments, housing 12 may include a lid or a cover that may be secured to a bottom portion of docking station 10. Typically, housing 12 may provide an opening for placing computer components in docking station 10 and may provide for access to some of the computer components. Computer components include, but are not limited to, a media device such as an optical drive or a tape drive, an auxiliary device such as a computer card or module, a power supply such as a battery, and any other device suitable to be used with a computer system. For example, housing 12 may include an opening for a media device to be placed in media bay 44, as described below, such that the opening allows a user to access the media device while placed in docking station 10.

Computer hooks 16 may be formed as part of docking station 10 to attach to a portable computer. Typically, one or more computer hooks 16 may extend from docking station 10 and attach to a portion of a portable computer when the portable computer is coupled with docking station 10 at docking port 14. Computer hook 16 secures the portable computer to docking station 10 and prevents the portable computer from being removed from docking station 10. In some embodiments, one or more computer hooks 16 may be formed from an elongated hook, which may extend and attach to a bottom portion of a portable computer housing.

Ejection switch 18 may be used to remove the portable computer from the docking station 10. Typically, ejection switch 18 may be formed on housing 12 of docking station 10. Ejection switch 18 may be included as a separate mechanism, either electrical or mechanical, that is coupled to docking station 10. In some embodiments, ejection switch 18 may be a mechanical switch that includes a depressible button, which causes computer hooks 16 to release the portable computer housing allowing a user to remove the portable computer from docking station 10.

In certain embodiments, ejection switch 18 couple with ejection tab 19 to aid in removing the portable computer from docking station 10. Depression of ejection switch 18 may cause ejection tab 19 to extend from docking station 10 and apply force against a bottom portion of a portable computer housing. Ejection tab 19 may cause the computer to disengage docking port 14 and allow a user to remove the computer from docking station 10. Typically, ejection switch 18 activates ejection tab 19 following the release of computer hook 16 from the computer housing, thus permitting the removal of the portable computer from docking station 10.

Locking handle 20 may be associated with housing 12 to activate a multi-functional security mechanism 33, as described below, to secure docking station 10. Locking handle 20 may also include a locked orientation and an unlocked orientation. Locking handle 20 may move from an unlocked orientation to a locked orientation to secure a portable computer to docking station 10 and the computer components within docking station 10. In some embodiments, locking handle 20 slides in a direction parallel to housing 12 to activate the one or more security mechanisms. In the unlocked orientation, a user may attach a portable computer at docking port 14 and access the computer components placed in docking station 10. In the locked orientation, the portable computer and the computer components may be secured to docking station 10.

Locking handle 20 may also include lock aperture 22 formed in docking station 10. Lock aperture 22 may include an opening in housing 12 for attaching a lock to prevent the movement of locking handle 20. In some embodiments, lock aperture 22 may associate with visual indicator 23 and locking hole 25, as described below in greater detail. In certain example embodiments, lock aperture 22 may be formed to receive an axial pin tubular lock such as a KENSINGTON lock designed to be placed into lock aperture 22 and rotated to prevent removal of the lock. In one example embodiment, a first end of an axial pin tubular lock may be secured to a base (e.g., a stationary object) and a second end of the axial ping tubular lock may engaged with lock aperture 22 to prevent the movement of locking handle 20 and to prevent the theft of docking station 10 including the portable computer and any computer components associated with docking station 10.

Docking station 10 may further include or provide connections for a keyboard, a mouse, a video device, speakers, a microphone, or any other suitable device that may be connected with docking station 10. In alternate embodiments, docking station 10 may include additional ports for attaching other components to the portable computer such as USB ports, 1394 device ports, and other such ports. Further, docking station 10 may allow for additional components to be placed in or connected to docking station 10 for use or access by a user through the computer system.

Figure 2:
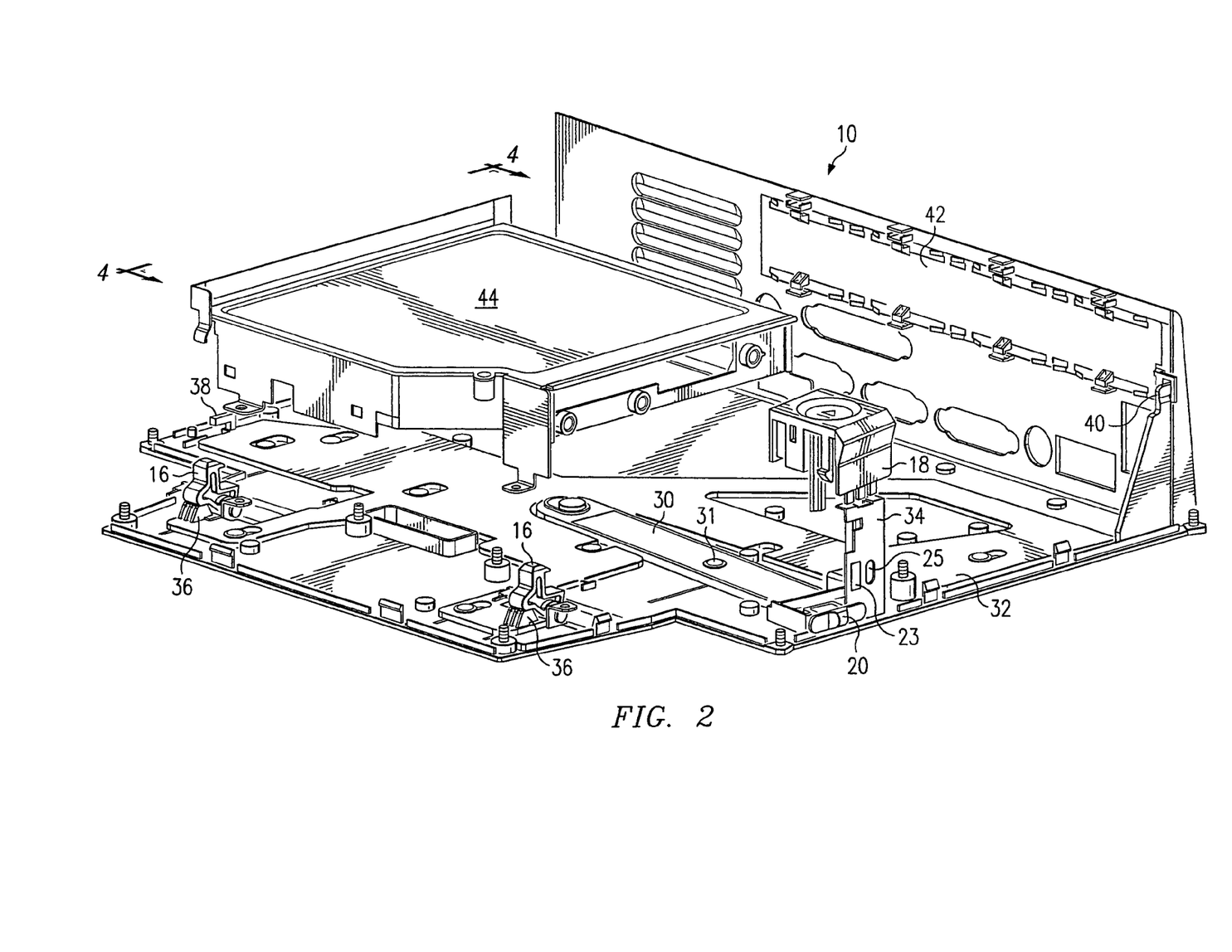
FIG. 2 illustrates a perspective view of an example embodiment of a multi-functional security mechanism with the lever placed in a locked position to secure the docking station according to the present disclosure.

FIG. 2 illustrates a perspective view of an example embodiment of multi-functional security mechanism 33 with lever 30 placed in a locked position to secure docking station 10. Multi-functional security mechanism 33 may include base plate 32 and lever 30 to engage one or more locks to secure one or more computer components to docking station 10. Examples of one or more locks may include ejection switch lock 34, computer hook lock 36, media bay lock 38, auxiliary bay lock 40, and any other lock suitable to secure a computer component to docking station 10.

Lever 30 may also include visual indicator 23. Visual indicator 23 may provide a warning or a notice to a user that docking station 10 is unlocked or unsecured. In some embodiments, visual indicator 23 may be viewed by looking through lock aperture 22 formed in housing 12 when lever 30 is moved to the unlocked position. For example, visual indicator 23 may include a red label that is visible when viewed through lock aperture 22, which may notify a user that docking station 10 is unsecured and in an unlocked position.

Lever 30 may further include lever lock 25. In some embodiments, lever lock 25 may be formed in lever 30 for receiving a lock, which may extend though lock aperture 22 to prevent the movement of lever 30. Typically, lever lock 25 may be accessible through lock aperture 22 when lever 30 is moved to the locked position. In one example embodiment, lever lock 25 may receive an axial pin tubular lock such as a KENSINGTON lock designed to be placed into lever lock 25 and rotated to prevent removal of the lock.

Lever 30 may associate with base plate 32 to engage one or more locking mechanisms for securing docking station 10. Lever 30 may be connected with locking handle 20 to move between a locked position and an unlocked position. In certain embodiments, locking handle 20 may be formed as a part of lever 30.

Locking handle 20 may slide between the locked orientation and the unlocked orientation to cause lever 30 to engage and disengage the one or more locks. Typically, lever 30 may cause base plate 32 to slide along a guided direction to activate or deactivate the one or more locks. Additionally, lever 30 may prevent base plate 32 from moving out of a locked orientation to an unlocked orientation by restricting the movement of base plate 32. Thus, base plate 32 may remain in a locked orientation when lever 30 is placed in a locked position. In some embodiments, lever 30 may rotate around axis 31 to move base plate 32 in a guided direction that is substantially parallel to the direction of locking handle 20.

Base plate 32 is disposed within docking station 10 to secure one or more computer components. In some embodiments, base plate 32 may be formed to slide along guided tracks to move the one or more locks into a locked orientation. As base plate 32 moves to a locked orientation, the one or more locks may engage their respective device. For example, base plate 32 may move computer hook lock 36 to engage with computer hook 16 whereby computer hook 16 engages a portable computer and prevents the removal of the portable computer from docking station 10.

Ejection switch lock 34 may be included in docking station 10 to prevent the activation of ejection switch 18. In some embodiments, ejection switch lock 34 may be coupled to lever 30 to move between a locked and unlocked orientation. In the unlocked orientation, ejection switch lock 34 allows a user to depress ejection switch 18 in order to remove a portable computer from docking port 14. In the locked orientation, ejection switch 34 may prevent the activation of ejection switch 18 so that when a user depresses ejection switch 18, ejection switch 18 does not engage, and the portable computer remains securely coupled to docking station 10. For example, ejection switch lock 34 may move proximate ejection switch 18 to create a physical barrier to the activation of ejection switch 18. In other embodiments, ejection switch lock 34 may electronically or mechanically prevent ejection switch 18 from activating to release the portable computer from docking port 14. Although ejection switch lock 34 may be associated with lever 30, ejection switch lock 34 may also be coupled to or associated with base plate 32 in alternate embodiments.

Computer hook lock 36 may prevent the removal of computer hook 16 from a portable computer coupled to docking station 10. In some embodiments, computer hook lock 36 may be coupled to base plate 32 to move between a locked and an unlocked orientation. In the unlocked orientation, computer hook lock 36 may allow computer hook 16 to release a portable computer from docking station 10. In the locked orientation, computer hook lock 36 may prevent computer hook 16 from releasing the portable computer connected to docking station 10. For example, computer hook lock 36 may be formed from a block wedge that is placed on base plate 32 to prevent computer hook 16 from releasing a portable computer attached to docking station 10. The block wedge slides with the movement of base plate 32 into a locked orientation to prevent the movement of computer hook 16.

Media bay lock 38 may be associated with base plate 32 to prevent a media device from being removed from docking station 10. Base plate 32 may activate media bay lock 38 to engage a media device placed in media bay 44. In example embodiments, media bay lock 38 may release a media bay locking mechanism 35, as described below, to engage and prevent removal of a media device placed in docking station 10.

Auxiliary bay lock 40 may prevent access to an auxiliary bay located within docking station 10. In some embodiments, auxiliary bay may include auxiliary bay cover 42 that may form a part of housing 12. Auxiliary bay cover 42 may prevent access to computer components placed in auxiliary bay within docking station 10 that interface with docking station 10. By moving locking handle 20 to a locked orientation, auxiliary bay lock 40 may engage a portion of auxiliary bay cover 42 to prevent the removal of auxiliary bay cover 42 and prevent access to the auxiliary bay. For instance, auxiliary bay cover 42 may slide over an access opening to the auxiliary bay, whereby auxiliary bay lock 40 prevents auxiliary bay cover 42 from sliding away from the opening in order to restrict access to the auxiliary computer components.

The auxiliary bay may include auxiliary computer components or any other component interface that may be connected with a computer system. For example, auxiliary bay may be a peripheral component interface (PCI) bay, which may receive a computer component such as a PCI card. The PCI bay may include a PCI bay cover that may be locked with a PCI lock to prevent access to the PCI card within the PCI bay.

Figure 3:
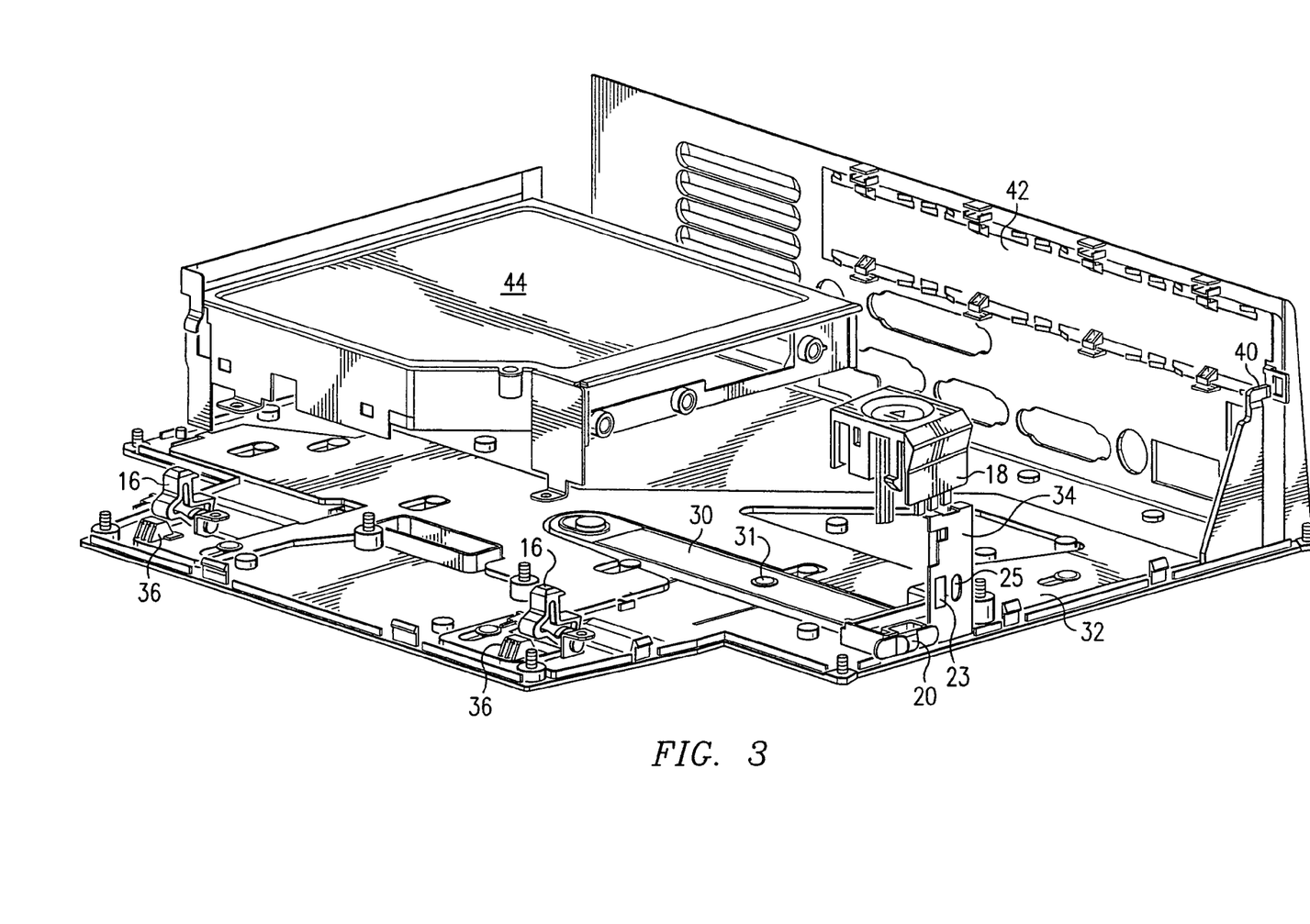
FIG. 3 illustrates a perspective view of an example embodiment of The multi-functional security mechanism with the lever placed in an unlocked position to unsecure the docking station according to the present disclosure.

FIG. 3 illustrates a perspective view of an example embodiment of multi-functional security mechanism with lever 30 placed in an unlocked position to unsecure docking station 10. Lever 30 may be rotated or slid into the unlocked position by locking handle 20. In the unlocked position, lever lock 25 may not be visible through lock aperture 22 in housing 12. Visual indicator 23, however, may be visible through lock aperture 22 to warn or alert users that docking station 10 may not be secure.

Ejection switch lock 34 may also be moved to an unlocked orientation to allow ejection switch 18 to activate. Activation of ejection switch 18 may cause the removal of a portable computer coupled at docking port 14. In some embodiments, ejection switch 18 includes a spring return mechanism (not shown), which may allow ejection switch 18 to an "undepressed" position after a user depresses ejection switch 18.

Computer hook locks 36 may be moved to an unlocked orientation to allow actuation of computer hooks 16. Upon activating ejection switch 18 or any other device operable to undock a portable computer from docking station 10, computer hook 16 may rotate and/or retract to an unlocked orientation, and allow the portable computer to be removed from docking station 10. Additionally, in the unlocked orientation, computer hook 16 may also be retracted to allow for the placement or the attachment of a portable computer to the docking station 16. Consequently, in some embodiments, computer hook locks 36 with lever 30 in the locked position may prevent the activation of computer hook 16, which may prevent a computer from being attached to or removed from docking station 10.

Lever 30 in the unlocked position allows for auxiliary bay lock 40 to disengage from auxiliary bay cover 42 to allow access to the auxiliary bay within docking station 10. In some embodiments, auxiliary bay cover 42 may be removed from docking station 10. In other embodiments, auxiliary bay cover 42 may slide in a direction perpendicular to auxiliary bay lock 40 to permit the removal of auxiliary bay cover 42. With auxiliary bay cover 42 removed, a user may have access to the auxiliary bay components for either removal and/or addition of the components to the auxiliary bay within docking station 10.

Figure 4:
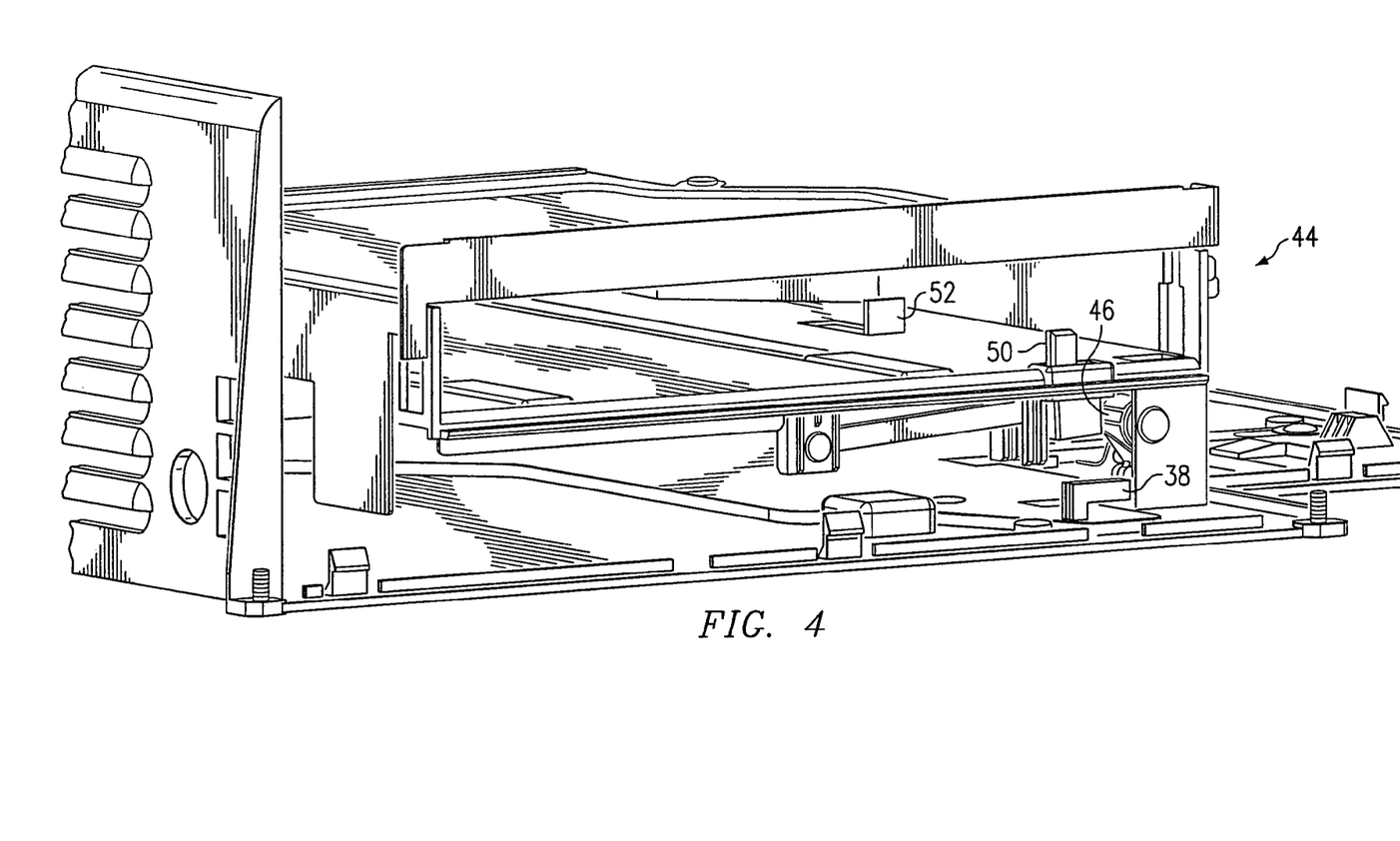
FIG. 4 illustrates a perspective view of an example embodiment of a media bay including a media bay locking mechanism associated with the docking station according to the present disclosure.

FIG. 4 illustrates a perspective view of an example embodiment of media bay 44 including media bay locking mechanism 35 associated with docking station 10. Media bay 44 may be associated with docking station 10 to permit a media device to be in communication with a portable computer, docking station 10, or any other appropriate connected computer device. Media bay locking mechanism 35 may be associated with media bay 44 to prevent the removal of the media device from media bay 44. In some embodiments, media bay lock 38 may be included on base plate 32 to activate media bay locking mechanism 35 associated with media bay 44 as base plate 32 moves between a locked and unlocked orientation. For example, media bay locking mechanism 35 includes locking member 46, lock pin 50, and media device sensor 52.

Locking member 46 may be associated with media bay 44 to cause lock pin 50 to engage and disengage a media device in media bay 44. Typically, locking member 46 activates as media bay lock 38 moves between a locked and unlocked orientation. In some embodiments, media bay lock 38 may engage first locking arm 46a to cause locking member 46 to rotate and apply force to lock pin 50 via second locking arm 46b such that lock pin 50 may engage a media device in media bay 44. In one example embodiment, second locking arm 46b uses a spring force (e.g., a torsion spring force) to apply pressure on lock pin 50 to extend into media bay 44 for engaging the media device.

When lever 30 is placed in the unlocked position, media bay lock 38 may disengage first locking arm 46a, which causes locking member 46 to rotate to an unlocked orientation. With locking member 46 in the unlocked orientation, second locking arm 46b retracts lock pin 50 to allow for removal of the media device placed in media bay 44.

Lock pin 50 may be associated with media bay 44 to engage a media device placed in connection with media bay 44. Lock pin 50 may prevent access to or removal of the media device placed in media bay 44, as described below. In an example embodiment, lock pin 50 may extend into a portion of media bay 44 to engage a media device.

Media device sensor 52 may be associated with media bay 44. Media device sensor 52 may be used to determine whether a media device is placed within media bay 44 to permit lock pin 50 to engage the media device. In some embodiments, media device sensor 52 may prevent lock pin 50 from extending into media bay 44 until a media device is placed in media bay 44. For example, media device sensor 52 may include a tab within media bay 44 that retracts when a media device is placed in media bay 44 to allow lock pin 50 to engage the media device. In some instances, with lever 30 in the locked position, media bay locking mechanism 35 may permit a media device to be placed in media bay 44. Once media device sensor 52 determines that the media device is placed in media bay 44, media device sensor 52 may permit lock pin 50 to engage the media device in media bay 44.

Figure 5A:
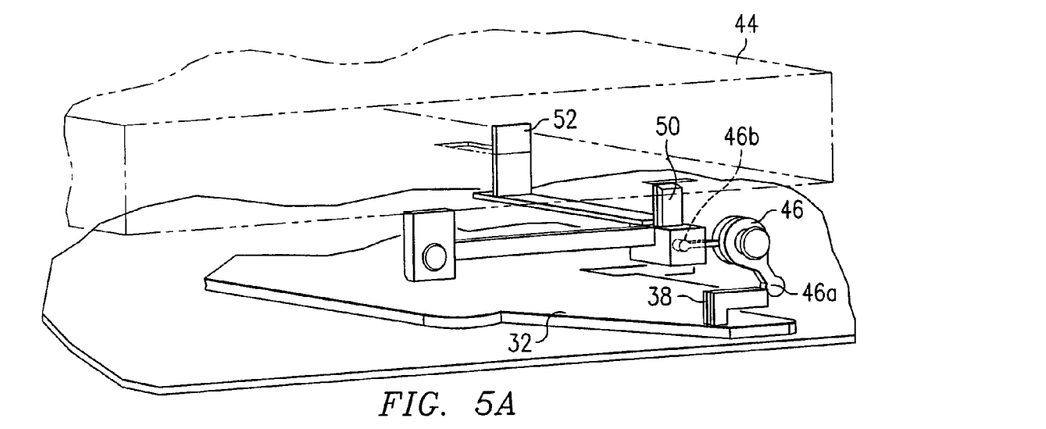
FIGS. 5A through 5C illustrate an example embodiment of the media bay locking mechanism moving from an unlocked orientation to a locked orientation according to the present disclosure.
Figure 5B:
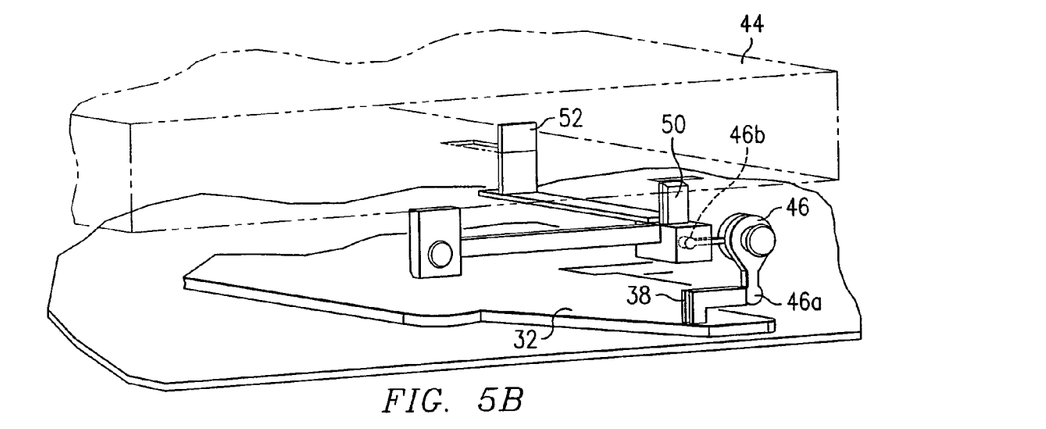
Figure 5C:
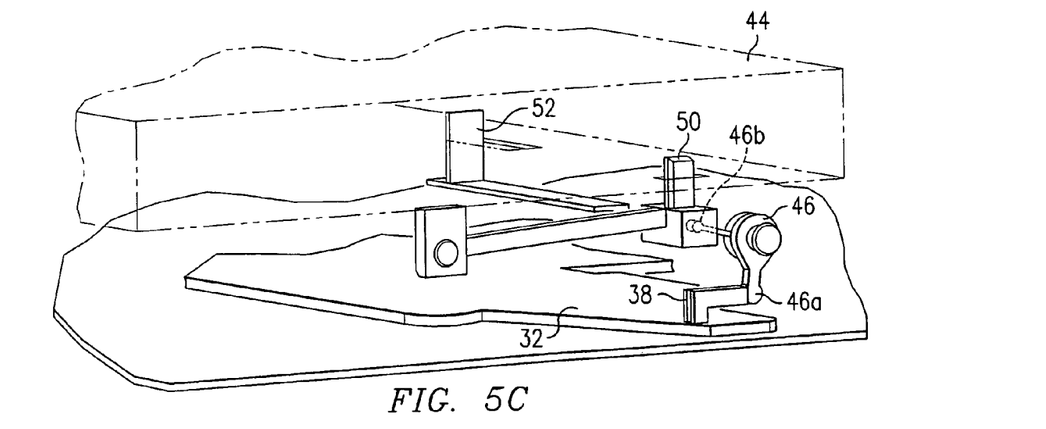

FIGS. 5A through 5C illustrate an example embodiment of media bay locking mechanism 35 moving from an unlocked orientation to a locked orientation. Referring to FIG. 5A, media bay 44 may be shown without a media device present in media bay 44 and base plate 32 moved to the unlocked orientation. In an unlocked orientation, media bay lock 38 may engage first locking arm 46a, which causes locking member 46 to rotate and retract lock pin 50 via second locking arm 46b. With lock pin 50 in the retracted position, a media device may be accessed and/or removed from media bay 44.

Referring to FIG. 5B, base plate 32 moves to a locked orientation causing media bay lock 38 to disengage with first locking arm 46a. With first locking arm 46a disengaged from media bay lock 38, locking member 46 may rotate to cause second locking arm 46b to apply a spring force to cause lock pin 50 to extend into media bay 44 to engage a media device in media bay 44. In some instances, media device sensor 52, however, may prevent lock pin 50 from extending into media bay 44 until a media device is placed in media bay 44. Hence, lock pin 50 may remain in an unextended position with second locking arm 46b continuing to apply the spring force until a media device is placed into media bay 44.

Referring to FIG. 5C, a media device (not shown) may be placed into media bay 44. In some embodiments, media device sensor 52 may include a media device tab that is displaced to a retracted position when a media device is placed in media bay 44, thus allowing lock pin 50 to extend into media bay 44. Because base plate 32 is set in a locked orientation and media device sensor 52 in a retracted position due to the presence of a media device in media bay 44, lock pin 50 may extend into a media device placed in media bay 44.

In certain embodiments, a media device may be placed in media bay 44 while base plate 32 may be in a locked orientation. For example, media bay 44 may be in a position similar to FIG. 5B, shown with base plate 32 in a locked orientation but no media device placed in media bay 44. Once the media device is placed in media bay 44, media device sensor 52 may detect the presence of the media device in media bay 44 to allow lock pin 50 to engage the media device, thus securing the media device to docking station 10.

Although the present disclosure has been described with respect to a specific embodiment, various changes and modifications will be readily apparent to one skilled in the art. The present disclosure is not limited to the illustrated embodiment, but encompasses such changes and modifications that fall within the scope of the appended claims.

What is claimed is:

1. A docking station, comprising:
   at least one hook operable to secure a portable computer to the docking station;
   a base plate associated with the docking station, the base plate having a locked orientation and an unlocked orientation the base plate actuates the at least one hook;
   a lever coupled to the base plate, wherein the movement of the lever actuates the base plate between the locked orientation and the unlocked orientation;
   a media bay disposed in the docking station, the media bay operable to receive a media device;
   a media bay locking mechanism coupled to the media bay, the media bay locking mechanism operable to engage the media device and prevent removal of the media device from the media bay;
   a media bay lock coupled to the base plate, wherein the movement of the base plate causes the media bay lock to actuate the media bay locking mechanism for engaging the media device placed in the media bay; and
   a media device tab associated with the media bay locking mechanism and movable between a first position and a second position, the media device tab operably determines whether the media device is placed in the media bay by moving between the first position and the second position, wherein if the base plate is in the locked orientation and the media device is moved to the second position indicating that the media device is present in the media bay, the media bay locking mechanism is permitted to engage the media device.

2. The docking station of claim 1, further comprising a computer hook lock coupled to the base plate, the computer hook lock operable to secure a portable computer and to prevent the at least one hook from releasing the portable computer.

3. The docking station of claim 2, wherein the computer hook lock comprises a block wedge attached to the base plate, the block wedge operable to prevent the movement of the at least one hook.

4. The docking station of claim 1, further comprising:
   an ejection switch associated with the docking station, the ejection switch operable to actuate the at least one hook for releasing the portable computer; and
   an ejection switch lock coupled to the base plate, the ejection switch lock operable to prevent the actuation of the ejection switch.

5. The docking station of claim 1, further comprising a lock aperture operable to receive a lock to prevent actuation of the base plate.

6. The docking station of claim 1, further comprising a visual indicator associated with the base plate, the visual indicator operable to provide external indication of whether the base plate is in the locked orientation or the unlocked orientation.

7. A method for securing a docking station, the method comprising:
- attaching a portable computer to the docking station with at least on hook;
- sliding a lever associated with a base plate to a locked position to actuate one or more locks associated with the docking station;
- in response to sliding the lever, the actuation of the one or more locks automatically engaging an ejection switch lock to prevent the activation of an ejection switch for releasing the portable computer from the docking station;
- in response to sliding the lever, the actuation of the one or more locks automatically determining if a media device is located in a media bay;
- in response to sliding the lever, activating a media bay lock pin for engaging the media device based on the determination that the media device is located in the media bay; and in response to sliding the lever, activating the at least one hook to attach the portable computer to the docking station.

8. The method of claim 7, wherein the media device is present in the media bay, further comprising automatically engaging the media device in the media bay with the media bay lock pin to prevent removal of or access to the media device.

9. The method of claim 7, wherein the media device is present in the media bay, further comprising:
- placing a media device in the media bay while the lever is in the locked position; and
- in response to placing the media device in the media bay, automatically engaging the media device with the media bay lock pin.

10. The method of claim 7, further comprising:
- attaching a portable computer to the docking station using at least one hook; and
- in response to the actuation of the one or more locks, automatically engaging a computer hook lock to prevent the at least one hook from releasing the portable computer.

11. The method of claim 7, further comprising attaching a lock to the docking station, the lock operable to prevent the lever from sliding to an unlocked position.

12. The method of claim 11, wherein attaching the lock to the docking station further comprises inserting a first end of a lock in a lock aperture coupled to the lever, whereby the actuation of the lever is prevented.

13. The method of claim 12, further comprising attaching a second end of lock to a base to prevent the theft of the docking station and the portable computer.

14. The method of claim 7, further comprising visually indicating on the docking station whether the lever is placed in the locked orientation.

15. An information handling system, comprising:
- a docking station operable to receive a portable computer at a docking port;
- a computer hook located on the docking station, the computer hook operable to secure the portable computer to the docking station;
- a lever associated with the docking station, the lever operable to move between an unlocked position and a locked position;
- a base plate connected with the lever, the base plate operable to actuate along a guided path to engage one or more locks and the base plate connected the computer hook to secure the portable computer to the docking station;
- an ejection mechanism coupled to the docking station, the ejection mechanism operable to actuate the computer hooks to release the portable computer;
- a hook lock operable to prevent the computer hook from releasing the portable computer from the docking station;
- an ejection lock operable to prevent the actuation of the ejection mechanism on the docking station;
- a media device sensor associated with a media bay, the media device sensor operable to determine whether a media device is placed in the media bay;
- the media device sensor operably moves between a first position indicating the media device is not present in the media bay and a second position indicating the media device is present in the media bay; and
- a media bay lock pin coupled to the media bay, the media bay lock pin operable to engage the media device in the media bay if the media device is determined to be placed in the media bay, the media bay lock pin associated with the base plate, the base plate operable to actuate the media lock pin between a first position and a second position.

16. The information handling system of claim 15, further comprising a locking aperture forming a part of the docking station, the locking aperture sized and located to allow an axial pin tubular lock to prevent movement of the lever from the locked position.

17. The information handling system of claim 15, wherein the portable computer is selected from the group consisting of a notebook computer, a laptop computer and a hand-held computer.

18. A security device for a media bay, comprising:
- a lock pin associated with the media bay, the lock pin operable to prevent removal of a media device from the media bay;
- a media device sensor associated with the media bay, the media device sensor operable to move between a first position and a second position to determine if the media device is located in the media bay;
- the first position indicating the media device is present in the media bay;
- the second position indicating the media device is not present in the media bay; and
- a media bay locking member coupled to the media bay, the media bay locking member operable to move between a locked orientation and an unlocked orientation, wherein the media bay locking member activates the lock pin to engage the media device in the locked orientation,
- wherein the lock pin extends to engage the media device only if the media device sensor detects the media device in the media bay.

19. The security device of claim 18, further comprising:
- a lock aperture associated with the media bay locking member, the lock aperture operable to prevent movement of the media bay locking member.

* * * * *